R. S. MOSES.
FISHING REEL.
APPLICATION FILED AUG. 3, 1920.
1,398,197.
Patented Nov. 22, 1921.
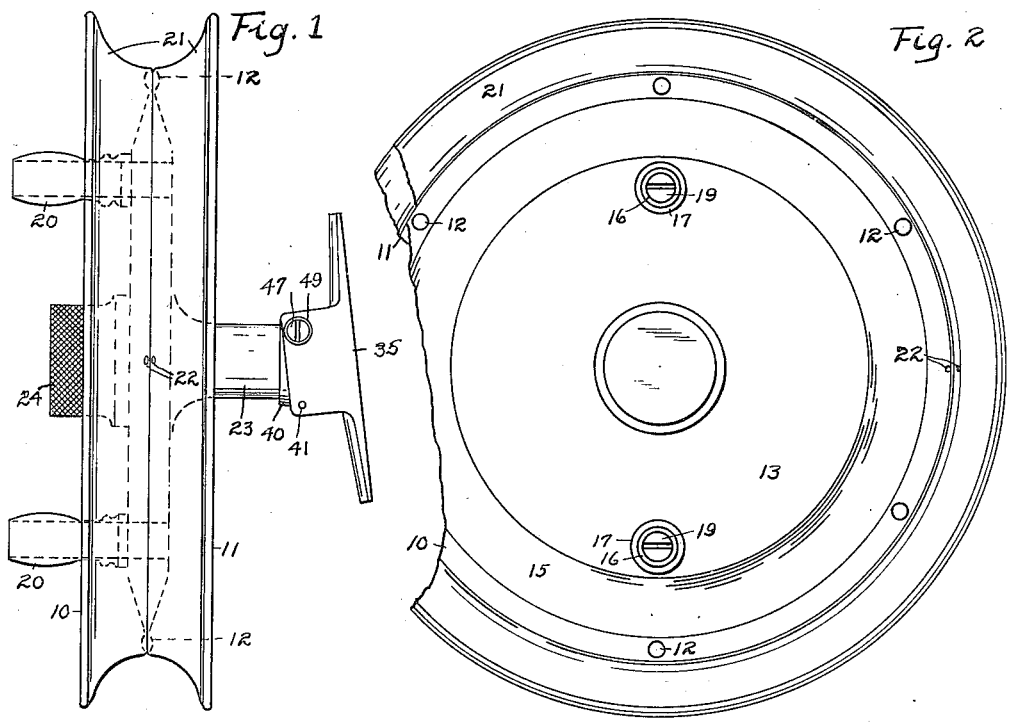
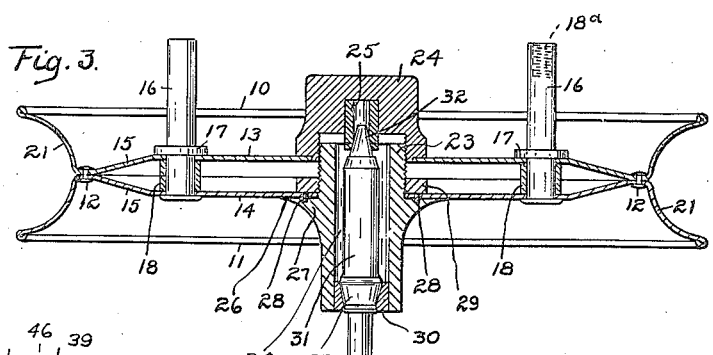
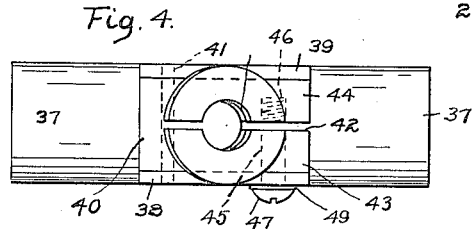
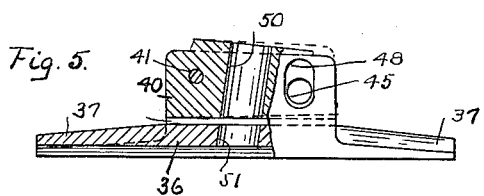
INVENTOR
Robert S. Moses
By Elwin M. Hulse
ATTORNEY.

UNITED STATES PATENT OFFICE.

ROBERT S. MOSES, OF KENDALLVILLE, INDIANA.

FISHING-REEL.

1,398,197.  Specification of Letters Patent.  Patented Nov. 22, 1921.

Application filed August 3, 1920. Serial No. 401,047.

*To all whom it may concern:*

Be it known that I, ROBERT S. MOSES, a citizen of the United States, residing at Kendallville, in the county of Noble and State of Indiana, have invented new and useful Improvements in Fishing-Reels, of which the following is a specification.

The invention relates to fishing reels and particularly to the type of such reels attachable to the side of fishing poles or rods, and its object is to provide a simple and economically constructed device which shall be highly efficient in operation.

The invention consists in a novel form of reel body and support and seat for the same.

In the accompanying drawings I have illustrated an embodiment of the invention in which Figure 1 is an edge elevational view of a device constructed in accordance with the invention; Fig. 2 a front elevational view of the same; Fig. 3 a central cross-sectional view of the same, the seat being removed; Fig. 4 an enlarged plan view of the seat and Fig. 5 a side elevational view of the seat partly in section.

Referring to the drawings, the reel body is formed of two similar annular disks 10 and 11 secured together by rivets 12. The central portions 13 and 14 of the disks are spaced apart and substantially parallel, the inclined portions 15 serving to add rigidity to the body. Two posts 16 extend through both disks, the rear end of each being flattened against disk 11 and each post having a collar 17 thereon which bears against portion 13 of disk 10 and also a sleeve 18 disposed between the disks to support the disks and add rigidity to the reel body. The forward end of each disk is apertured and internally threaded at 18ᵃ to receive screw 19 by which handle sleeve 20 is held on the post, the handle being freely revoluble on the post, so that when the operator grasps either handle he may rotate the reel with ease. The outer portion of each disk is flared laterally to form a curved annular flange 21, the flanges coöperating to form an annular groove or line receiving space on the entire periphery of the reel body. Apertures 22 are formed in the flanges and in the disks adjacent the flanges through all of which the inner end of the line may be passed and tied.

Apertures are formed in the center of both disks through which sleeve 23 is inserted, the opposite ends of the sleeve being extended forwardly and rearwardly respectively from the disks. The forward end of the sleeve is externally threaded to receive a milled nut 24 carrying a cone bearing 25, and a lock nut 29 threaded on said sleeve between the disks when tightened against disk 11 coöperates with shoulder 26 formed by flange 27 on the sleeve to firmly clamp disk 11 to the sleeve. Pins 28 are inserted in apertures formed in flange 27, their forward ends projecting into apertures formed in disk 11 to prevent rotation of the disk on the sleeve. The flange 27 is flared to form a braking surface upon which the thumb of the user may be applied to control the rotation of the reel body. A cone bearing 30 is fixed in the rear end of sleeve 23 and shaft 31 having cone portions 32 and 33 is supported in the cone bearings 25 and 30. By rotating cap 24 in proper direction the shaft is caused to seat in the bearings with greater or less firmness as desired, since the tightening of the cap on the sleeve causes bearing 25 to advance toward disk 10 and thereby not only increase the friction between that bearing and the shaft but also cause the shaft to move rearwardly to tighten in bearing 30.

The portion of the shaft between the cone portions 32 and 33 is less in diameter than the inner diameter of the sleeve thus forming a space 34 for lubricant, the space being sufficiently large to hold enough lubricant to last during a season's use of the reel.

The rear end of the shaft projects from the sleeve and is secured in seat 35. This seat comprises a base 36 having opposite end extensions 37, the rear face of the base and extensions being concaved to engage the side of the handle of the pole or rod with the extensions engaged under the usual devices on such handles for securing the seat to the same. The base is bifurcated or longitudinally channeled to form walls or supports 38 and 39 between which block 40 is pivoted at 41. The forward side of the block is inclined and abuts the rear end of sleeve 23, the inclination being such that the base and its extensions and particularly the concaved face thereof are and is angularly disposed with respect to the reel body but capable of being adjusted to increase or decrease the said angle. The block is slit longitudinally at 42 for a portion of its length to form tongues or arms 43 and 44 and aperture 45 is formed in tongue 43, socket 46 in arm 44 being internally threaded and in alinement with aperture 45. Screw 47 is engaged in socket 46 and extends through aperture 45 and through slot 48 formed in wall 38, lock washer 49 being disposed behind the head of the screw to prevent accidental rotation of the screw.

Aperture 50 is formed in block 40 and intersects slot 42, the aperture being at right angles, or substantially at right angles to the plane of the forward side of the block. Aperture 51 may also be formed in base 36 in alinement with aperture 50, but may be omitted. The rear end of shaft 31 extends into aperture 50 and may be of sufficient length to extend into aperture 51, the latter aperture being of sufficient diameter to permit the shaft to move laterally upon relative movement between the block and base. When the screw 47 is loosened the base may be rocked on pivot 41, or the block rocked on the pivot to secure proper alinement of the reel body with the guides on the pole. In practice the seat will be secured to the pole and the reel manipulated to rock the block until the proper alinement of the line receiving groove and the pole guides is obtained. Screw 47 is then tightened to cause tongues 43 and 44 to clamp upon shaft 31 and also lock the block to the base. Thereafter no further adjustment of the reel is necessary for the particular pole. It will be noted that the bearings of the reel body permit of their ready adjustment to take up wear or to change the degree of friction in the bearings, all that is necessary to do to accomplish such adjustment being to turn the cap or nut 24 in the proper direction.

The interior of the bearing sleeve or hub 23 being hollow heavy oil or light vaseline may be used, the space surrounding the shaft being filled with the same for a long period of use.

The reel being adjustable with respect to the pole or rod there is no necessity of attaching additional guards to the pole or rod in order to secure alinement of the line receiving space on the reel with the guards usually secured to the pole or rod.

The smooth surface on the periphery of the reel body being circular materially lengthens the life of the ordinary casting line since there are no prongs or other projecting points likely to entangle the line nor upon which the line may bear or rub in casting or reeling in. It also avoids drying the line.

What I claim is:

1. In a fishing reel a base adapted to be secured to a fishing rod, said base being bifurcated to form spaced walls, a block positioned between said walls and pivotally connected adjacent one end to the walls, said block being slit longitudinally for a portion of its length to provide opposite arms, one of said walls being slotted at the end remote from the pivotal connection, a clamping screw passing through said slot and one of the arms and threaded into the other arm whereby rotation of the screw in one direction will lock the block in adjusted position about the pivotal connection and will draw said arms together, a reel, a shaft whereon said reel rotates having an end arranged to enter between said arms when the clamping screw is loose, the tightening of said screw causing gripping of the shaft by the said arms to hold the same in position.

2. In a reel of the class described, a reel hub including a sleeve having a flange thereon, one end of the sleeve being threaded; a reel body including a pair of similar annular disks having their central portions spaced and fitted on the threaded end of the sleeve, a lock nut threaded on the sleeve between said disks and screwed toward said flange to clamp one of the disks against the flange, and a hub cap screwed on the end of the sleeve and bearing against the other disk.

In witness whereof I have hereunto signed my name this 22nd day of July, 1920.

ROBERT S. MOSES.